(12) United States Patent
Cao et al.

(10) Patent No.: US 11,079,353 B2
(45) Date of Patent: Aug. 3, 2021

(54) METHOD AND SENSOR FOR DETECTING L-CYSTEINE BASED ON 3,3'-DITHIOBIS (1-PROPANESULFONATE)-MERCURY COMPOSITE MEMBRANE

(71) Applicant: CHANGSHA UNIVERSITY OF SCIENCE AND TECHNOLOGY, Changsha (CN)

(72) Inventors: Zhong Cao, Changsha (CN); Yuyu Peng, Changsha (CN); Chen Liu, Changsha (CN); Ling Tang, Changsha (CN); Qin Zhu, Changsha (CN); Min Jin, Changsha (CN); Jinglin He, Changsha (CN); Zhongliang Xiao, Changsha (CN)

(73) Assignee: CHANGSHA UNIVERSITY OF SCIENCE AND TECHNOLOGY, Changsha (CN)

( * ) Notice: Subject to any disclaimer, the term of this patent is extended or adjusted under 35 U.S.C. 154(b) by 0 days.

(21) Appl. No.: 16/955,797

(22) PCT Filed: Aug. 24, 2019

(86) PCT No.: PCT/CN2019/102373
§ 371 (c)(1),
(2) Date: Jun. 19, 2020

(87) PCT Pub. No.: WO2020/057325
PCT Pub. Date: Mar. 26, 2020

(65) Prior Publication Data
US 2021/0025846 A1     Jan. 28, 2021

(30) Foreign Application Priority Data

Sep. 17, 2018  (CN) .......................... 201811080260.9
Sep. 17, 2018  (CN) .......................... 201821515523.X

(51) Int. Cl.
*G01N 27/414*     (2006.01)

(52) U.S. Cl.
CPC ............................... *G01N 27/4145* (2013.01)

(58) Field of Classification Search
None
See application file for complete search history.

(56) References Cited

FOREIGN PATENT DOCUMENTS

| CN | 101915799 A | 12/2010 |
|---|---|---|
| CN | 105891309 A | 8/2016 |

(Continued)

OTHER PUBLICATIONS

Ishige, Y. et al."Extended-gate FET-based enzyme sensor with ferrocenyl-alkanethiol modified gold sensing electrode", Biosensors and Bioelectronics, vol. 24, No. 5, Jun. 17, 2008 (Jun. 17, 2008), ISSN:0956-5663, pp. 1096-1102.

*Primary Examiner* — J. Christopher Ball
(74) *Attorney, Agent, or Firm* — Bayramoglu Law Offices LLC

(57) ABSTRACT

A method and a sensor for detecting L-cysteine based on a 3,3'-dithiobis (1-propanesulfonate)-mercury composite membrane are provided. The method includes: implanting a p-well and an N-type substrate on field effect transistor substrate, constructing a source electrode and a drain electrode at the p-well, constructing a silicon dioxide layer on the substrate, plating an aluminum-copper alloy layer, a chromium-palladium alloy layer, and a gold film layer on a polysilicon gate substrate, constructing a silicon nitride layer on the substrate and the silicon dioxide layer; extending a gate part; preparing an ethanol solution of disodium 3,3'-dithiobis (1-propanesulfonate), cleaning and soaking gate gold electrode in the solution, followed by soaking in an ethanol solution of mercuric nitrate, and then washing the gate gold electrode; connecting electrode interfaces, insert- (Continued)

ing the electrode into PBS, and connecting power interfaces to a stabilized voltage supply, connecting a signal output interface to a multimeter.

12 Claims, 5 Drawing Sheets

(56) References Cited

FOREIGN PATENT DOCUMENTS

| CN | 107024522 A | 8/2017 |
|---|---|---|
| CN | 107367534 A | 11/2017 |
| CN | 109187697 A | 1/2019 |
| CN | 209247682 U | 8/2019 |

METHOD AND SENSOR FOR DETECTING L-CYSTEINE BASED ON 3,3'-DITHIOBIS (1-PROPANESULFONATE)-MERCURY COMPOSITE MEMBRANE

CROSS REFERENCE TO THE RELATED APPLICATIONS

This application is the national phase entry of International Application No. PCT/CN2019/102373, filed on Aug. 24, 2019, which is based upon and claims priority to Chinese Patent Application No. 201811080260.9, filed on Sep. 17, 2018, and Chinese Patent Application No. 201821515523.X, filed on Sep. 17, 2018, the entire contents of which are incorporated herein by reference.

TECHNICAL FIELD

The present invention belongs to the technical field of chemical/biological sensing, and more specifically, relates to a method and a sensor for detecting L-cysteine based on a 3,3'-dithiobis (1-propanesulfonate)-mercury composite membrane, that is, a selective potentiometric membrane sensor, which is suitable for detection in life science, clinical medicine, and the like.

BACKGROUND

L-cysteine is the only amino acid containing an active sulfhydryl group (—SH) among 20 essential amino acids, and has been widely used in medicine, food and cosmetics industries due to its important physiological functions. Therefore, it is imperative to develop methods for detecting L-cysteine. In recent years, the common methods for detecting L-cysteine include high-performance liquid chromatography (HPLC), flow injection analysis (FIA), high-performance capillary electrophoresis (HPCE), gas chromatography-mass spectrometry (GC-MS), liquid chromatography-mass spectrometry (LC-MS), fluorescence analysis, and so on. However, these are all indirect methods and being restricted in practice use, because these methods generally require expensive instruments, have complex experimental operation procedures, and need skilled technicians, which all make it difficult to achieve real-time, on-line detection and miniaturization. L-cysteine (having the structural formula as follows) contains electrochemically active groups such as amino and sulfhydryl groups, as a result, it can be detected by electroanalytical methods.

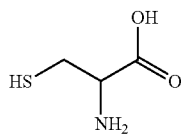

Structure formula of L-cysteine

Electroanalytical methods have gained extensive attention in the development of sensors because of their low cost, high sensitivity, rapid determination, easy miniaturization and others. Recently, current-mode electrochemical sensors are mainly used to determine L-cysteine worldwide, but they still have some limitations in real-time and on-line detection.

Self-assembly technology is an effective means to tailor an ideal interface conveniently at the molecular level. Compared with traditional Langmuir-Blodgett (LB) films, self-assembled monolayers (SAMs) have significantly improved orderliness and stability, and can be widely used in various fields, such as nonlinear optics, molecular devices, electron transfer reaction, lubrication, anticorrosion, catalysis, etching and the like. Sulfhydryl groups are used as electrode modification materials, which can effectively promote the loading, adhesion and electron transfer of electroactive materials, and endow modified electrodes with excellent electrochemical activity.

However, there are few reports on potentiometric electrochemical sensors with simple fabrication, high sensitivity, easy miniaturization for detecting L-cysteine on line.

SUMMARY

To overcome the shortcomings of the prior art, the present invention provides a method and a sensor for detecting L-cysteine based on a 3,3'-dithiobis (1-propanesulfonate)-mercury composite membrane.

To achieve the above objective, the present invention provides the following technical solution.

The method for detecting L-cysteine based on the 3,3'-dithiobis (1-propanesulfonate)-mercury composite membrane includes the following steps:

(1) implanting a p-well and an N-type substrate on a Si substrate of a field effect transistor, constructing a source electrode and a drain electrode at the p-well by thermal evaporation and magnetron sputtering, then constructing a silicon dioxide layer on the Si substrate after being implanted with the p-well and the N-type substrate and constructed with the source electrode and the drain electrode, followed by successively plating an aluminum-copper alloy layer, a chromium-palladium alloy layer, and a gold film layer on the substrate of a polysilicon gate by the thermal evaporation and magnetron sputtering, and next, constructing a silicon nitride layer on the substrate of the polysilicon gate and the silicon dioxide layer; subsequently, extending a gate part by a distance of 0.1-500 mm to obtain an extended gate field effect transistor with a gate gold electrode;

(2) preparing an ethanol solution of disodium 3,3'-dithiobis (1-propanesulfonate), cleaning the extended gate field effect transistor with the gate gold electrode, followed by soaking the gate gold electrode of the extended gate field effect transistor in the ethanol solution of disodium 3,3'-dithiobis (1-propanesulfonate) in a dark and dry environment, and putting aside at 25° C., then removing and washing the gate gold electrode, followed by soaking in a prepared ethanol solution of mercuric nitrate and putting aside, subsequently, washing the gate gold electrode after being soaked to obtain a 3,3'-dithiobis (1-propanesulfonate)-mercury composite membrane gate gold electrode modified by the 3,3'-dithiobis (1-propanesulfonate)-mercury composite membrane; and (3) connecting electrode interfaces of a reference electrode, the 3,3'-dithiobis (1-propanesulfonate)-mercury composite membrane gate gold electrode, and the extended gate field effect transistor to form a differential amplifier circuit with high input impedance and high output impedance, inserting the reference electrode and the 3,3'-dithiobis (1-propanesulfonate)-mercury composite membrane gate gold electrode into a phosphate buffer solution (PBS), and connecting power interfaces of the extended gate field effect transistor to positive and negative poles of a stabilized voltage supply, respectively, connecting a signal output interface of the extended gate field effect transistor to a test port of a multimeter, so as to form a complete sensing detection circuit; wherein a potential change of the system is detected sensitively by an in-situ signal amplification of the field effect transistor; the potential of the 3,3'-dithiobis (1-propanesulfonate)-mercury composite membrane gate gold electrode that acts as a working electrode tends to become stable with the increase of time in the PBS, and after the potential is stable, samples to be tested containing different concentrations of L-cysteine are added, and then corresponding potential response data are obtained to complete the detection of L-cysteine in the samples to be tested.

Preferably, in step (1), during successively plating the aluminum-copper alloy layer, the chromium-palladium alloy layer, and the gold film layer on the substrate of the polysilicon gate by the thermal evaporation and magnetron sputtering, the plating vacuum degree is less than or equal to $5.0\times10^{-6}$ torr, the plating speed is less than or equal to 2.0 Å/s, and the passivation is carried out with $Si_3N_4$; the aluminum-copper alloy layer includes the following components by weight: 40-68 parts of Al, 30-60 parts of Cu, 2-12 parts of Ni, 1-8 parts of Fe, 1-6 parts of Ti, and 0.01-0.50 parts of Nb; the chromium-palladium alloy layer includes the following components by weight: 40-80 parts of Cr, 10-40 parts of Pd, 2-12 parts of Ni, 1-8 parts of Fe, 1-6 parts of Ti, and 0.01-0.50 parts of Nb; the thickness of the aluminum-copper alloy layer is 20-600 nm, the thickness of the chromium-palladium alloy layer is 20-600 nm, and the thickness of the gold film layer is 20-1000 nm.

Preferably, in step (2), the concentration of the ethanol solution of disodium 3,3'-dithiobis (1-propanesulfonate) is 1.0-10.0 mmol/L; in the ethanol solution of mercuric nitrate, a volume ratio of a mercuric nitrate aqueous solution to anhydrous ethanol is 1:1, and the concentration of the mercuric nitrate aqueous solution is 0.1-50.0 mmol/L. In step (2), the gate gold electrode is soaked in the ethanol solution of disodium 3,3'-dithiobis (1-propanesulfonate) for 1-72 h, and soaked in the ethanol solution of mercuric nitrate for 1-72 h.

Preferably, the reference electrode in step (3) is a saturated calomel electrode or an Ag/AgCl electrode integrated with a saturated KCl solution, and the working electrode is 3,3'-dithiobis (1-propanesulfonate)-mercury composite membrane gate gold electrode. In step (3), the PBS has a pH value of 3.0-11.0 and a concentration of 0.1 mol/L, and the pH value is preferably 6.0.

The present invention further provides a sensor for detecting L-cysteine, including a field effect transistor. The field effect transistor is provided with an extended gate gold electrode, that is, a gate gold electrode, wherein the gate part is extended by 0.1-500 mm, and the surface of the gold film layer of the gold electrode is assembled with the 3,3'-dithiobis (1-propanesulfonate)-mercury composite membrane.

Specifically, the field effect transistor includes a Si substrate and a polysilicon gate provided on the Si substrate. A p-well and an N-type substrate are implanted on the Si substrate, and a source electrode and a drain electrode are provided at the p-well. A silicon dioxide layer is provided on the Si substrate after being implanted with the p-well and the N-type substrate and constructed with the source electrode and the drain electrode. A substrate of the polysilicon gate is successively plated with an aluminum-copper alloy layer, a chromium-palladium alloy layer, and a gold film layer, and a silicon nitride layer is provided on the substrate of the polysilicon gate and the silicon dioxide layer. The thickness of the aluminum-copper alloy layer is 20-600 nm, the thickness of the chromium-palladium alloy layer is 20-600 nm, and the thickness of the gold film layer is 20-1000 nm.

The sensor has a good Nernst response to L-cysteine with a linear range of $1.0\times10^{-7}$-$1.0\times10^{-4}$ mol/L, a response sensitivity of 123.4 mV·pc$^{-1}$, and a detection limit of $8.32\times10^{-8}$ mol/L.

The present invention is further illustrated as follows.

In the present invention, the gate gold electrode (GGE) of the field effect transistor (FET) is extended by a certain distance, such as 0.1-500 mm. Through a soaking method, a gold electrode modified by a self-assembly composite membrane GGE/DTPS-Hg is obtained by self-assembling and adhering 3,3'-dithiobis (1-propanesulfonate) (DTPS) and mercuric ion ($Hg^{2+}$) on the surface of the gold electrode, successively. The electrochemical behavior of L-cysteine (L-Cys) at the modified electrode is studied, and a novel electrochemical method for detecting L-cysteine is established. Under optimized experimental conditions, a good linear relationship between the potential value and the concentration of L-cysteine in the range of $1.0\times10^{-7}$-$1.0\times10^{-4}$ mol/L is presented at the modified electrode. The regression equation thereof can be fitted to $\Delta E=-123.4 \log C-874.3$, the correlation coefficient is 0.9918, and the minimum detection limit of the method is $8.32\times10^{-8}$ mol/L. The electrode has a super Nernst response to L-Cys, and is highly sensitive and selective. The electrode is used to detect the content of L-Cys in porcine serum samples, and the recovery rate is determined to be 95.2%-102.4%, indicating that the electrode can be used for the detection of L-cysteine in actual samples, and can be widely used in life science, clinical medicine and so on.

BRIEF DESCRIPTION OF THE DRAWINGS

in FIG. 3A and FIG. 3B, a is GGE, b is GGE/DTPS, c is GGE/DTPS-Hg, and d is GGE/DTPS-Hg/L-Cys.

DETAILED DESCRIPTION OF THE EMBODIMENTS

I. Experimental Process

Figure 1:
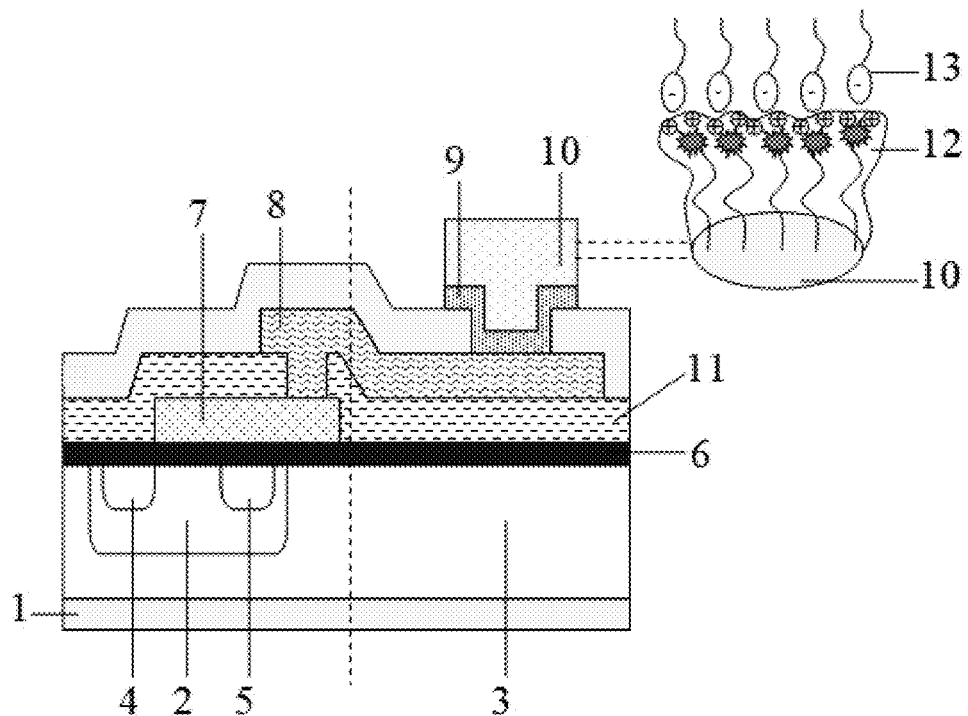
FIG. 1 is a schematic diagram showing a design of an extended gate field effect transistor and a sensor. In the figure: 1, Si substrate, 2, source electrode, 3, drain electrode, 4, p well, 5, N-type substrate, 6, silicon dioxide layer, 7, polysilicon gate, 8, aluminum-copper alloy layer, 9, chromium-palladium alloy layer, 10, gold film, 11, silicon nitride layer, 12, 3,3'-dithiobis (1-propanesulfonate)-mercury composite membrane, and 13, L-cysteine.

1. Design of Extended Gate Field Effect Transistor and Preparation of Gate Gold Electrode FIG. 1 is a schematic diagram of the design of the extended gate field effect transistor and the sensor, that is, combining the basic structure of a metal-oxide-semiconductor field-effect transistor (MOSFET). The p-well 2 and the N-type substrate 3 are implanted on the Si substrate 1 of the field effect transistor. The source electrode 4 and the drain electrode 5 are constructed at the p-well 2 by thermal evaporation and magnetron sputtering. Then, the silicon dioxide layer 6 is constructed on the Si substrate 1 after being implanted with the p-well 2 and the N-type substrate 3 and constructed with the source electrode 4 and the drain electrode 5, and next, the aluminum-copper alloy layer 8, the chromium-palladium alloy layer 9, and the gold film layer 10 are successively plated on the substrate of the polysilicon gate 7 by the thermal evaporation and magnetron sputtering. Finally, the silicon nitride layer 11 is constructed on the substrate of the polysilicon gate 7 and the silicon dioxide layer 6. The aluminum-copper alloy layer 8 includes the following components by weight: 40-68 parts of Al, 30-60 parts of Cu, 2-12 parts of Ni, 1-8 parts of Fe, 1-6 parts of Ti, and 0.01-0.50 parts of Nb. The chromium-palladium alloy layer 9 includes the following components by weight: 40-80 parts of Cr, 10-40 parts of Pd, 2-12 parts of Ni, 1-8 parts of Fe, 1-6 parts of Ti, and 0.01-0.50 parts of Nb. The thickness of the aluminum-copper alloy layer 8 is 20-600 nm, the thickness of the chromium-palladium alloy layer 9 is 20-600 nm, and the thickness of the gold film layer 10 is 20-1000 nm. During plating, the vacuum degree is maintained at less than or equal to $5.0 \times 10^{-6}$ torr and the plating speed is less than or equal to 2.0 Å/s. The gold electrode is extended by 250 mm in the gate part, and the field effect transistor wafer is passivated by using $SiO_2$ and $Si_3N_4$, so as to prevent the wafer except for Au part from coming into contact with the solution, thus forming the extended gate field effect transistor (EGFET). Different physical/chemical modifications are carried out on the membrane surface of the extended gate gold electrode (GGE) of the EGFET to form a sensitive membrane, so as to realize the sensitive detection of an object to be tested. According to the self-assembly method, 3,3'-dithiobis (1-propanesulfonate) (DTPS) and mercuric ion ($Hg^{2+}$) are self-assembled and adhered on the surface of gate gold electrode to obtain a 3,3'-dithiobis (1-propanesulfonate)-mercury composite membrane gate gold electrode (GGE/DTPS-Hg) modified by the 3,3'-dithiobis (1-propanesulfonate)-mercury composite membrane 12.

2. Preparation of Modified Electrode.

Mechanical treatment: first, the gate gold electrode is soaked in a strong oxidizing Piranha solution for 0.1-15.0 min, such as 2.0 min. Then, grinding and polishing are performed, including: pouring an appropriate amount of α-$Al_2O_3$ (1.0 μm, 0.05 μm, and 0.3 μm) and pure water on a polishing cloth, and then gradually polishing from coarse to fine, and cleaning the surface dirt after each polishing. Finally, ultrasonic cleaning is performed for 5 min in ultra-pure water, anhydrous ethanol, and ultra-pure water, respectively.

Gold electrode modified by soaking method: 2 mL (5.0 mol) of disodium 3,3'-dithiobis (1-propanesulfonate) and 2 mL of anhydrous ethanol are taken into a pre-dried beaker by a pipette and then the electrode is soaked in the mixed solution. The beaker is sealed with a sealing film and placed in a dark and dry environment for the electrode modification for 48 h. Subsequently, the electrode is taken out and cleaned, then soaked in a mixed solution including 2 mL of mercuric nitrate solution (3.0 mmol/L) and 2 mL of anhydrous ethanol for further modification for 48 h. Finally, the modified electrode is taken out and rinsed for subsequent use.

3. Electrochemical Performance Test of Modified Gate Gold Electrode

First, different electrodes are prepared according to the above method, such as a non-modified gate gold electrode (GGE), a DTPS modified gate gold electrode (GGE/DTPS), a DTPS-Hg composite membrane modified gate gold electrode (GGE/DTPS-Hg), a DTPS-Hg composite membrane modified gate gold electrode combined with L-cysteine (GGE/DTPS-Hg/L-Cys). Using an electrochemical workstation, the above different electrodes are used as the working electrodes, and a potassium ferricyanide/potassium ferrocyanide solution (containing 2.0 mmol/L of $K_3[Fe(CN)_6]$, 2.0 mmol/L of $K_4[Fe(CN)_6]$, and 0.2 mol/L of $Na_2SO_4$) is used as the medium, so as to conduct the electrochemical performance test on the different electrodes by methods such as cyclic voltammetry (with a sweep rate of 0.05 V/s) and AC impedance analysis.

4. Optimization of Optimal Response Conditions in Experiments (1) Optimization of pH: PBS with gradient pH values (3.00-11.00) are prepared. 20 mL of the PBS (0.1 mol/L) with different pH values are used as the media, an appropriate amount of L-cysteine is added to the respective PBS to make the concentration of L-cysteine reach $1.0 \times 10^{-8}$ mol/L, $1.0 \times 10^{-7}$ mol/L, $1.0 \times 10^{-6}$ mol/L, $5 \times 10^{-6}$ mol/L, $1.0 \times 10^{-5}$ mol/L, $5.0 \times 10^{-5}$ mol/L, $1.0 \times 10^{-4}$ mol/L, etc. The potential of the solution is determined by using the DTPS-Hg composite membrane modified gate gold electrode as the working electrode and Ag/AgCl as the reference electrode. The curve of the relationship between the pH and the potential is plotted to obtain the pH of the optimal experimental response.

(2) Optimization of modification duration: the duration of modification by DTPS and $Hg^{2+}$ is determined based on time gradients of 4 h, 8 h, 12 h, 24 h, 36 h, 48 h, 60 h, and 72 h.

5. Interference Effect

L-cysteine is added to 20 mL of PBS (0.1 mol/L) with the pH value of 6.00 to reach a concentration of $1.0 \times 10^{-5}$ mol/L, and then different types of amino acids with concentrations of 50 times that of L-cysteine are added. The potential of the mixed solution is determined and recorded, and the interference effect of the different amino acids on the determination of L-cysteine is tested, so as to evaluate the selectivity of the prepared electrodes.

6. Determination of Repeatability

The identical GGE/DTPS-Hg electrode is used to detect the L-cysteine solutions with the concentrations of $1.0 \times 10^{-6}$ mol/L and $5.0 \times 10^{-6}$ mol/L for 10 times, and the output gate voltages of the sensor are recorded.

7. Determination of Recovery Rate

Six porcine serum samples are numbered K1, K2, K3, K4, K5, and K6, respectively. The supernatants are retained and diluted 10 times with PBS having pH value of 6.0, and the predetermined concentration of L-cysteine is added. The potential value is determined by a standard addition method. The recovery rate is calculated by comparing the potential value with the working curve.

II. Experimental Results and Analysis
1. Analysis of Electrode Response Mechanism 3,3'-dithiobis (1-propanesulfonate) (DTPS) is a substance having a disulfide bond with a symmetrical structure on both sides of the disulfide bond. The sulfur in the disulfide bond can form an Au—S bond with Au and thus be self-assembled on the surface of the gold electrode. As a disulfide compound (RSSR), the disulfide bond of the DTPS is easily reduced and broken in acidic electrolyte (PBS having the concentration of 0.1 mol/L and pH of 6.0) to form two identical structures with sulfhydryl groups. The reaction formula can be deduced as follows:

$$R-S-S-R+2H^++2e^- \rightleftharpoons 2R-SH \quad (1)$$

Figure 2:
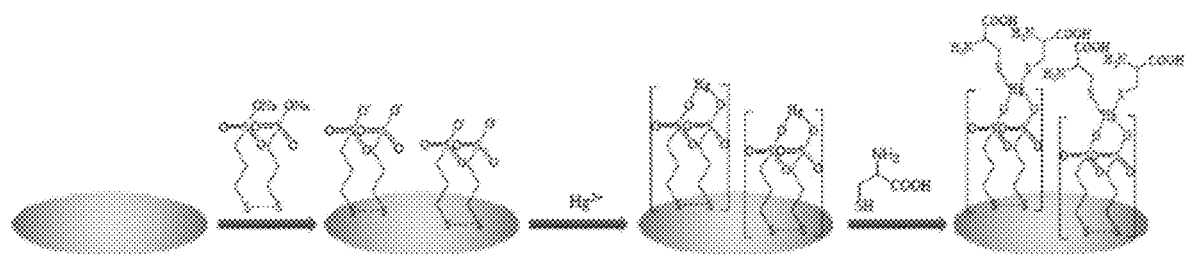
FIG. 2 is a schematic diagram showing an assembly of DTPS-Hg composite membrane and the principle of responding to L-cysteine molecules.

Further, under acidic conditions, the end of the DTPS with a sulfonate group is negatively charged, which will attract positively charged mercuric ions, that is, an adsorption and bonding occurs between two sulfonate groups of the DTPS molecule and the mercuric ions, respectively. Namely, one DTPS molecule can bond one mercuric ion to form GGE/DTPS-Hg. Meanwhile, under the acidic conditions, the end of L-cysteine with sulfhydryl and carboxyl groups is negatively charged. Because sulfur can form a stable and firm Hg—S bond with Hg, a coordination occurs between sulfhydryl groups of L-Cys and mercury for adsorption and bonding, that is, one DTPS-Hg can combine two L-Cyses, so that the L-Cys is in a valence state of −1/2. The recognition response principle is shown in FIG. 2.

2. Electrode Electrochemical Characterization and Analysis

Figure 3A:
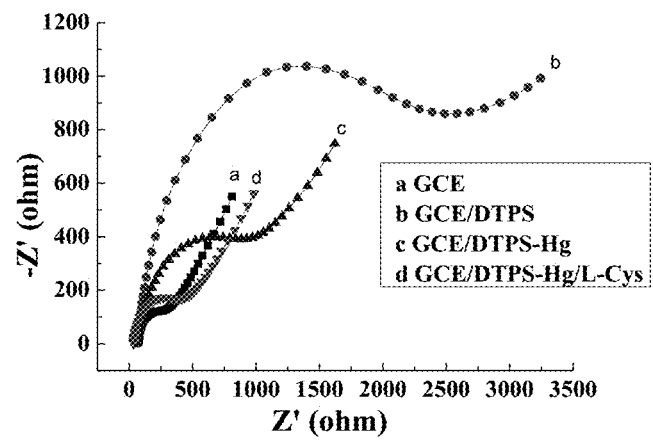
FIG. 3A and FIG. 3B are diagrams showing the results of alternating current (AC) impedance and cyclic voltammetry of different electrodes in a potassium ferricyanide/potassium ferrocyanide solution (containing 2.0 mmol/L of $K_3[Fe(CN)_6]$, 2.0 mmol/L of $K_4[Fe(CN)_6]$, and 0.2 mol/L of $Na_2SO_4$)
Figure 3B:
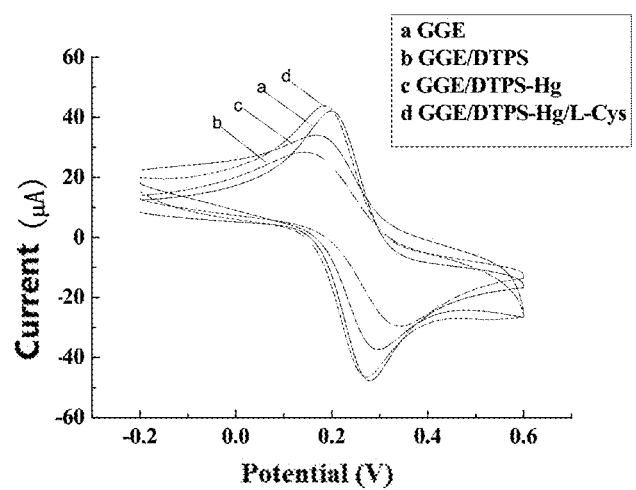

To verify the interaction between 3,3'-dithiobis (1-propanesulfonate)-mercury composite membrane carrier and L-cystine, the electrochemical behaviors of the above different modified membrane electrodes are investigated by AC impedance and cyclic voltammetry. FIG. 3A and FIG. 3B are diagrams showing the results of AC impedance and cyclic voltammetry of different electrodes (a is GGE, b is GGE/DTPS, c is GGE/DTPS-Hg, d is GGE/DTPS-Hg/L-Cys) in a potassium ferricyanide/potassium ferrocyanide solution (containing 2.0 mmol/L of $K_3[Fe(CN)_6]$, 2.0 mmol/L of $K_4[Fe(CN)_6]$, and 0.2 mol/L of $Na_2SO_4$).

According to the AC impedance shown in FIG. 3A: a is a pretreated non-modified gold electrode, and its impedance value is extremely small, indicating that the pretreated non-modified gold electrode has a strong ability to transfer electrons; b is a DTPS modified gold electrode, where the high frequency part is semicircular, and the impedance value increases obviously, indicating that a non-conductive monomolecular self-assembled membrane layer is formed on the surface of the gold electrode through the sulfhydryl groups at one end of DTPS, so as to hinder the electron conduction of $[Fe(CN)_6]^{3-/4-}$ on the electrode surface; c is a DTPS-Hg composite membrane modified electrode, the impedance decreases obviously, indicating the $Hg^{2+}$ modification is successfully achieved, and the conductivity of the self-assembled membrane layer is enhanced; and d is the DTPS-Hg composite membrane modified electrode combined with L-cysteine, and its impedance further decreases, because after the reaction between the DTPS-Hg composite membrane and L-cysteine occurs, the electron conductivity of L-cysteine is enhanced due to the negative ion characteristics of sulfhydryl and carboxyl groups in L-cysteine, resulting in electrochemical conduction current, thus diminishing interface impedance. The cyclic voltammetric behavior of the electrode further demonstrates the changing trend of its impedance (FIG. 3B). Therefore, this method is feasible for the identification and detection of L-cysteine.

Figure 4A:
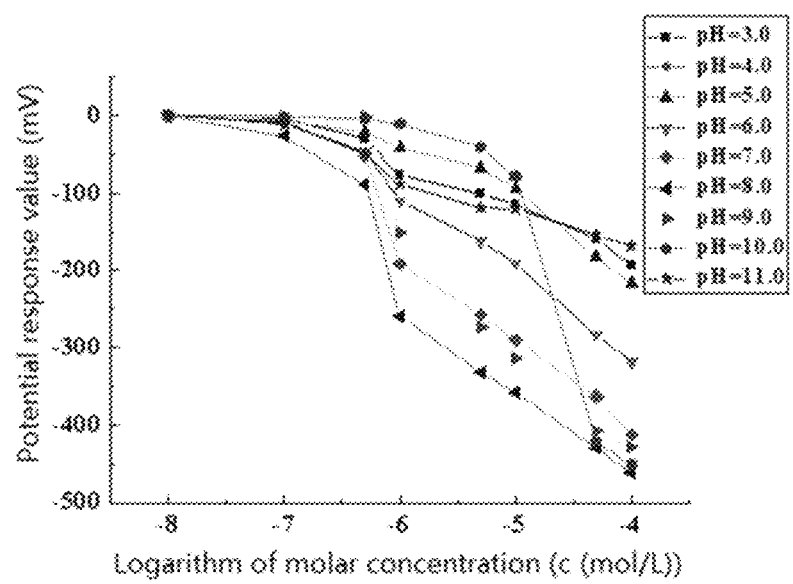
FIG. 4A shows curves of the relationship between the potentials of a DTPS-Hg composite membrane modified GGE and the concentrations of L-cysteine at different pH values.

3. Optimization of Optimal Response Conditions in Experiments 3.1 Optimization of pH The relationship between the potentials of a DTPS-Hg composite membrane modified GGE and the concentrations of L-cysteine at different pH values (pH 3.00-11.00) is investigated in this experiment (as shown in FIG. 4A), and the effect of the electrode slopes varying with the pH value is obtained (as shown in FIG. 4B).

Figure 4B:
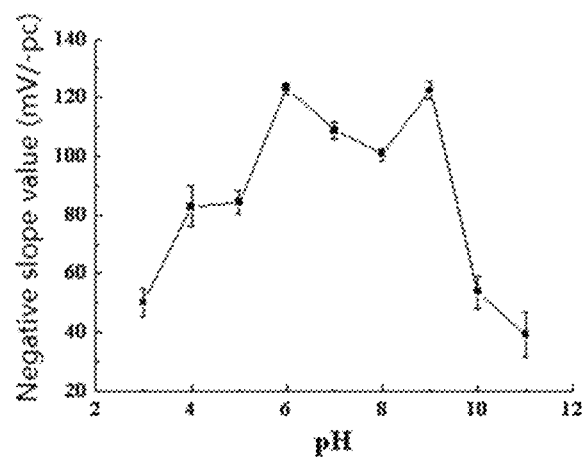
FIG. 4B is a diagram showing the effect of electrode slopes varying with pH values.

FIG. 4B shows that the slope increases with the increase of the pH value at the range of 3.00≤pH≤6.00, and the potential change decreases with the increase of the pH value at the range of 6.00≤pH≤10.00. Although the slope of the electrode is also relatively large when the pH value is 9.00, its linear range and its linear relationship are not good (as shown in FIG. 4A), so the condition with pH=6.00 is optimal. Moreover, using the electrode at the pH value of 6.00 has the following advantage: first, the detection is stable and rapid; second, the minimum detection limit is relatively low; and third, the linearity is excellent. Therefore, the pH value for the optimal response of this method is 6.00.

3.2 Optimization of Modification Duration

When the electrode is modified with DTPS for 4 h, 8 h, 12 h, 24 h, 36 h, 48 h, 60 h, and 72 h, respectively at a pH value of 6.0, the relationship between the electrode potential and the concentration of L-cysteine is investigated in this experiment, and the response slopes are obtained successively, and the relationship between the response slopes and the modification durations is achieved. It is found that the modified electrode has higher linear fit degree and lower error bar when the modification duration is 48 h, and the electrode slope reaches extraordinary and stable two times of Nernst response relationship. Therefore, 48 h is selected as the optimal electrode modification duration for the working electrode in the subsequent experiment. In addition, the bonding duration of mercuric ions is also investigated, and it is found that the electrode has the optimal response linearity and sensitivity when modified for 48 h.

4. Electrode Potential Response Performance

Figure 5:
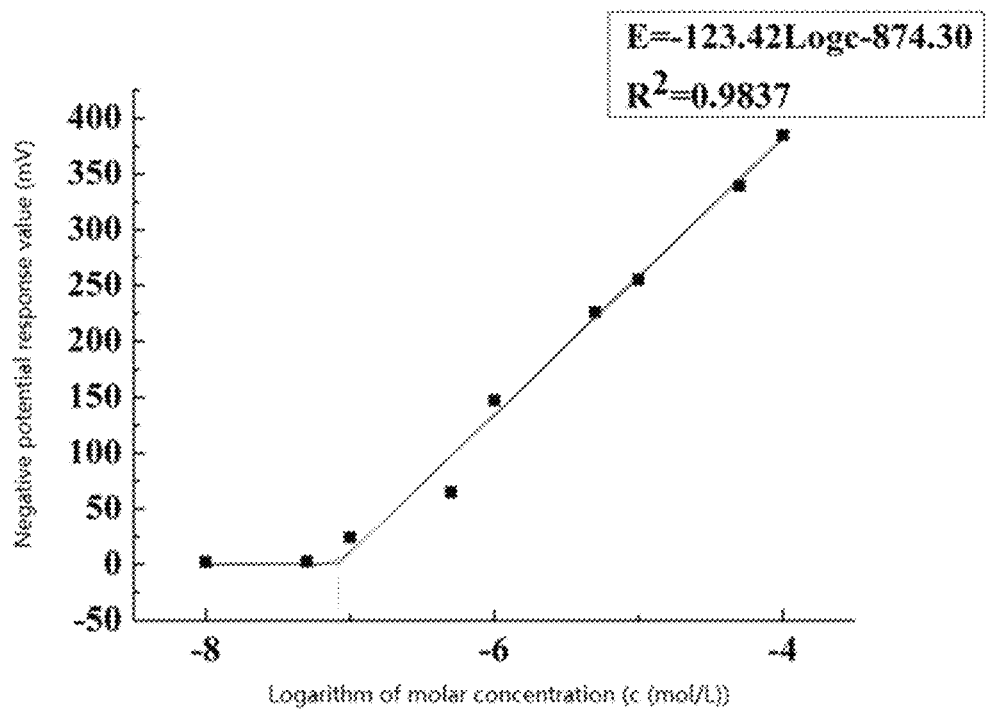
FIG. 5 shows a curve of the potential of the GGE/DTPS-Hg electrode combined with different concentrations of L-cysteine in PBS with the pH value of 6.0.

The potential response relationship of the GGE/DTPS-Hg electrode combined with different concentrations of L-cysteine in PBS with pH value of 6.0 is investigated in this experiment, and the results are shown in FIG. 5.

As can be seen from FIG. 5, as the concentration of L-cysteine increases, the potential value gradually decreases, indicating that the L-cysteine bonded on the surface of the modified electrode increases, and the electrode has a good linear response to L-cysteine ion in the concentration range of $1.0 \times 10^{-7}$-$1.0 \times 10^{-4}$ mol/L in the PBS with the pH value of 6.0. The linear equation thereof is fitted as $\Delta E = -123.4 \log C - 874.3$ by a least squares method with a correlation coefficient of 0.9918. The minimum detection limit can be obtained according to a graphing method, i.e., $8.32 \times 10^{-8}$ mol/L.

5. Interference Effect

Figure 6:
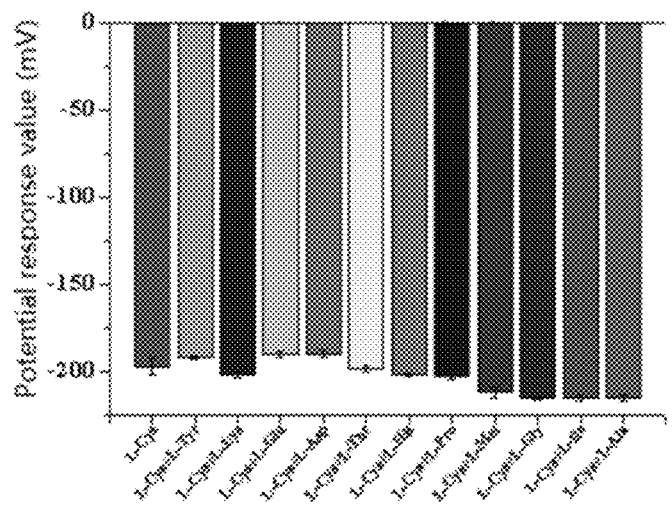
FIG. 6 is a diagram showing an effect of coexisting interfering components on the determination of L-cysteine by a GGE/DTPS-Hg electrode.

The effect of coexisting interference components on the determination of L-cysteine by the GGE/DTPS-Hg electrode is investigated in this experiment, and the results are shown in FIG. 6. $1.0 \times 10^{-5}$ mol/L of L-cysteine is added into 20 mL of PBS (0.1 mol/L) with the pH value of 6.00, followed by adding different types of amino acids with concentrations of 50 times that of L-cysteine, such as L-tyrosine (L-Tyr), L-lysine (L-Lys), L-glutamic acid (L-Glu), L-aspartic acid (L-Asp), L-threonine (L-Thr), L-histidine (L-His), L-proline (L-Pro), L-methionine (L-Met), L-glycine (L-Ghy), L-isoleucine (L-Ile), L-alanine (L-Ala). As can be seen from FIG. 6, when several other amino acids are added to the solution containing L-cysteine, no obvious change in the response potential is observed, indicating that the coexisting components have no effect on the determination of L-cysteine by the GGE/DTPS-Hg electrode.

Figure 7:
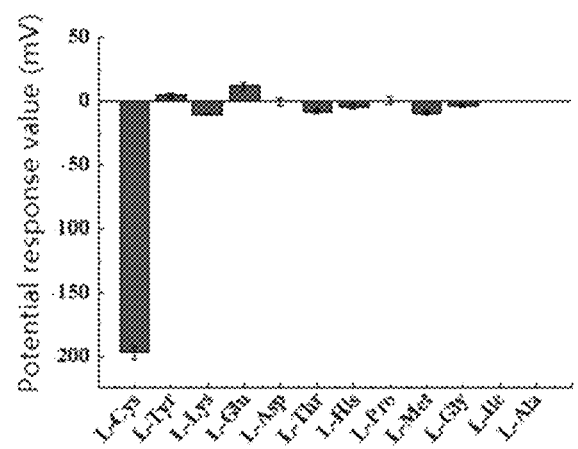
FIG. 7 is a diagram showing a selective response of a GGE/DTPS-Hg electrode in detecting L-cysteine.

The response sensitivity of the GGE/DTPS-Hg electrode to different amino acids, such as L-tyrosine (L-Tyr), L-lysine (L-Lys), L-glutamic acid (L-Glu), L-aspartic acid (L-Asp), L-threonine (L-Thr), L-histidine (L-His), L-proline (L-Pro), L-methionine (L-Met), L-glycine (L-Ghy), L-isoleucine (L-Ile), and L-alanine (L-Ala), is further investigated by separate solution method (as shown in FIG. 7), where the concentration of each amino acid is configured to be 50 times that of L-cysteine. The results show that the electrode has the greatest response to L-cysteine, while having extremely small responses to other amino acids, and even no response to some of them indicating that the electrode can be well used in selective detection of L-cysteine.

6. Response Time, Stability and Repeatability of the Electrode

The response time, stability and repeatability of the electrode are important indicators to reflect the performance of the electrode, and also indispensable indicators in improving the performance of composite membrane carrier selective electrodes. The response of the GGE/DTPS-Hg electrode to L-cysteine in the concentration range of $1.0 \times 10^{-7}$-$1.0 \times 10^{-4}$ mol/L is investigated in this experiment. The response time is calculated when reaching 95% of the maximum potential response value, and the response time of the electrode is 60 s. It can be seen that the reaction time for the electrode to reach equilibrium in the concentration range is extremely short, indicating that the electrode has a fast response speed to L-cysteine.

Subsequently, the GGE/DTPS-Hg electrode is used to continuously monitor the L-cysteine sample with a concentration of $1.0 \times 10^{-6}$ mol·L$^{-1}$ for 30 min, the potential drift is less then or equal to $\pm 1.0$ mV, the relative standard deviation of the potential data is 1.56% (n=5), indicating that the potential sensor has good stability. After monitoring the L-cysteine sample continuously for 30 days, the response slope of the electrode decreases by 25.4%, indicating that the potential sensor can be used for at least one month and has a long service life.

The repeatability of the potential response of the GGE/DTPS-Hg electrode combined with different concentrations of L-cysteine samples is further investigated, that is, the electrode is used to determine the potential values of the L-cysteine samples with the concentrations of $1.0 \times 10^{-6}$ mol/L and $5.0 \times 10^{-6}$ mol/L repeatedly, each concentration of L-cysteine is determined for 6 times (as shown in Table 1).

TABLE 1

Repeatability data of the modified electrode

| No. | Potential (mV) | |
| --- | --- | --- |
|  | $1.0 \times 10^{-6}$ mol/L | $5.0 \times 10^{-6}$ mol/L |
| 1 | −133 | −222 |
| 2 | −131 | −224 |
| 3 | −132 | −220 |
| 4 | −136 | −221 |
| 5 | −133 | −218 |
| 6 | −134 | −220 |
| AV | −133.2 | −220.8 |
| SD | ±1.72 | ±2.04 |
| RSD | 1.3% | 0.9% |

As shown in Table 1, the relative standard deviations (RSD) are 1.3% and 0.9%, respectively, indicating that the DTPS-Hg composite membrane modified gold electrode has a good repeatability for the detection of L-cysteine.

7. Recovery Rate of Electrode

Under the optimized experimental conditions, the concentration of L-cysteine in actual samples is determined by the DTPS-Hg self-assembled gate gold electrode. During the determination, six pretreated porcine serum samples are taken and numbered as $A_1$, $A_2$, $A_3$, $A_4$, $A_5$, and $A_6$, respectively. Their supernatants are retained and diluted 50 times with PBS with pH value of 6.0. The initial potential is first detected, and then the standard addition method is carried out to obtain the recovery rate of L-cysteine of 95.2%-102.4% (see Table 2). Meanwhile, the GGE/DTPS-Hg electrode in the present invention and the high-performance liquid chromatography (HPLC) are used in conducting a control experiment, and the relative deviation of the two methods ranges from −1.44% to 4.26%, indicating that the electrode can be used for the determination and analysis of L-cysteine content in actual samples, and has important application value in the fields of life science, clinical medicine, healthy breeding of livestock and poultry, etc.

TABLE 2

Determination of L-cysteine in porcine serum samples by GGE/DTPS-Hg modified electrode and recovery rates thereof

| Sample No. | HPLC (μM) | GGE/DTPS-Hg (μM) | Spiked (μM) | Found (μM) | Recovery (%) | RSD (%) |
| --- | --- | --- | --- | --- | --- | --- |
| Serum A1 | 0.152 | 0.155 | 0.200 | 0.354 | 101.0 | 2.5 |
| Serum A2 | 0.321 | 0.327 | 0.400 | 0.712 | 97.7 | 2.8 |
| Serum A3 | 0.412 | 0.428 | 0.600 | 1.003 | 98.5 | 1.7 |
| Serum A4 | 0.763 | 0.752 | 0.800 | 1.582 | 102.4 | 2.8 |
| Serum A5 | 0.651 | 0.658 | 1.000 | 1.673 | 102.2 | 1.3 |
| Serum A6 | 0.147 | 0.141 | 1.200 | 1.289 | 95.2 | 3.1 |

In sum, the present invention provides a gate gold electrode modified by a self-assembled DTPS-Hg composite membrane, where the potential signal is in situ amplified by a field effect transistor and has a sensitive response to L-cysteine, thereby forming a novel biosensor. The biosensor shows excellent molecular recognition for L-cysteine. When applying to the detection of L-Cys in porcine serum samples, the biosensor shows good stability, repeatability, selectivity and sensitivity, and has a good application prospect in the fields of life science, clinical medicine, healthy breeding of livestock and poultry, etc.

What is claimed is:

1. A method for detecting L-cysteine based on a 3,3'-dithiobis (1-propanesulfonate)-mercury composite membrane, comprising the following steps:
    (1) implanting a p-well and an N-type substrate on a Si substrate of a field effect transistor, constructing a source electrode and a drain electrode at the p-well by a thermal evaporation and a magnetron sputtering, then constructing a silicon dioxide layer on the Si substrate after being implanted with the p-well and the N-type substrate and constructed with the source electrode and the drain electrode, followed by successively plating an aluminum-copper alloy layer, a chromium-palladium alloy layer and a gold film layer on a substrate of a polysilicon gate by the thermal evaporation and the magnetron sputtering, and next, constructing a silicon nitride layer on the substrate of the polysilicon gate and the silicon dioxide layer; subsequently, extending a gate part of the polysilicon gate by a distance of 0.1-500 mm to obtain an extended gate field effect transistor with a gate gold electrode;

(2) preparing an ethanol solution of disodium 3,3'-dithiobis (1-propanesulfonate), cleaning the gate gold electrode of the extended gate field effect transistor, soaking the gate gold electrode of the extended gate field effect transistor in the ethanol solution of disodium 3,3'-dithiobis (1-propanesulfonate) in a dark and dry environment, and putting the ethanol solution of disodium 3,3'-dithiobis (1-propanesulfonate) aside at 25° C., then taking out and washing the gate gold electrode of the extended gate field effect transistor, followed by soaking the gate gold electrode of the extended gate field effect transistor in an ethanol solution of mercuric nitrate, putting the ethanol solution of mercuric nitrate aside, and then washing the gate gold electrode of the extended gate field effect transistor after being soaked to obtain a 3,3'-dithiobis (1-propanesulfonate)-mercury composite membrane gate gold electrode modified by a 3,3'-dithiobis (1-propanesulfonate)-mercury composite membrane; and (3) connecting an electrode interface of a reference electrode, an electrode interface of the 3,3'-dithiobis (1-propanesulfonate)-mercury composite membrane gate gold electrode, and an electrode interface of the extended gate field effect transistor to form a differential amplifier circuit with a high input impedance, inserting the reference electrode and the 3,3'-dithiobis (1-propanesulfonate)-mercury composite membrane gate gold electrode into a phosphate buffer solution (PBS), and connecting power interfaces of the extended gate field effect transistor to positive and negative poles of a stabilized voltage supply, respectively, connecting a signal output interface of the extended gate field effect transistor to a test port of a multimeter to form a complete sensing detection circuit; wherein a potential change of a system is detected sensitively by using an in-situ signal amplification of the extended gate field effect transistor; potential of the 3,3'-dithiobis (1-propanesulfonate)-mercury composite membrane gate gold electrode as a working electrode tends to be stable with an increase of time in the PBS, and after the potential is stable, samples to be tested containing different concentrations of L-cysteine are added, and then corresponding potential response data corresponding to the samples to be tested are obtained to complete a detection of L-cysteine in the samples to be tested.

2. The method according to claim 1, wherein, in step (1), during successively plating the aluminum-copper alloy layer, the chromium-palladium alloy layer, and the gold film layer on the substrate of the polysilicon gate by the thermal evaporation and the magnetron sputtering, a plating vacuum degree is less than or equal to $5.0 \times 10^{-6}$ torr, a plating speed is less than or equal to 2.0 Å/s, and a passivation is carried out with $Si_3N_4$; the aluminum-copper alloy layer includes the following components by weight: 40-68 parts of Al, 30-60 parts of Cu, 2-12 parts of Ni, 1-8 parts of Fe, 1-6 parts of Ti, and 0.01-0.50 parts of Nb; the chromium-palladium alloy layer includes the following components by weight: 40-80 parts of Cr, 10-40 parts of Pd, 2-12 parts of Ni, 1-8 parts of Fe, 1-6 parts of Ti, and 0.01-0.50 parts of Nb; a thickness of the aluminum-copper alloy layer is 20-600 nm, a thickness of the chromium-palladium alloy layer is 20-600 nm, and a thickness of the gold film layer is 20-1000 nm.

3. The method according to claim 1, wherein, in step (2), a concentration of the ethanol solution of disodium 3,3'-dithiobis (1-propanesulfonate) is 1.0-10.0 mmol/L; in the ethanol solution of mercuric nitrate, a volume ratio of a mercuric nitrate aqueous solution to anhydrous ethanol is 1:1, and a concentration of the mercuric nitrate aqueous solution is 0.1-50.0 mmol/L.

4. The method according to claim 1, wherein, in step (2), the gate gold electrode of the extended gate field effect transistor is soaked in the ethanol solution of disodium 3,3'-dithiobis (1-propanesulfonate) for 1-72 h, and soaked in the ethanol solution of mercuric nitrate for 1-72 h.

5. The method according to claim 1, wherein the reference electrode in step (3) is a saturated calomel electrode or an Ag/AgCl electrode integrated with a saturated KCl solution, and the working electrode is the 3,3'-dithiobis (1-propanesulfonate)-mercury composite membrane gate gold electrode.

6. The method according to claim 1, wherein, in step (3), the PBS has a pH value of 3.0-11.0 and a concentration of 0.1 mol/L.

7. A sensor for detecting L-cysteine, comprising a field effect transistor, wherein the field effect transistor is provided with an extended gate gold electrode; in the extended gate gold electrode, a gate part is extended by 0.1-500 mm, and a surface of a gold film layer of the extended gate gold electrode is assembled with a 3,3'-dithiobis (1-propanesulfonate)-mercury composite membrane.

8. The sensor according to claim 7, wherein the field effect transistor comprises a Si substrate and a polysilicon gate provided on the Si substrate, a p-well and an N type substrate are implanted on the Si substrate, and a source electrode and a drain electrode are provided at the p-well, a silicon dioxide layer is provided on the Si substrate after being implanted with the p-well and the N-type substrate and constructed with the source electrode and the drain electrode, a substrate of the polysilicon gate is successively plated with an aluminum-copper alloy layer, a chromium-palladium alloy layer, and a gold film layer, and a silicon nitride layer is provided on the substrate of the polysilicon gate and the silicon dioxide layer.

9. The sensor according to claim 8, wherein a thickness of the aluminum-copper alloy layer is 20-600 nm, a thickness of the chromium-palladium alloy layer is 20-600 nm, and a thickness of the gold film layer is 20-1000 nm.

10. The sensor according to claim 7, wherein the sensor has an ultra Nernst response to L-cysteine with a linear range of $1.0 \times 10^{-7}$-$1.0 \times 10^{-4}$ mol/L, a response sensitivity of 123.4 mV·pc$^{-1}$, and a detection limit of $8.32 \times 10^{-8}$ mol/L.

11. The sensor according to claim 8, wherein the sensor has an ultra Nernst response to L-cysteine with a linear range of $1.0 \times 10^{-7}$-$1.0 \times 10^{-4}$ mol/L, a response sensitivity of 123.4 mV·pc$^{-1}$, and a detection limit of $8.32 \times 10^{-8}$ mol/L.

12. The sensor according to claim 9, wherein the sensor has an ultra Nernst response to L-cysteine with a linear range of $1.0 \times 10^{-7}$-$1.0 \times 10^{-4}$ mol/L, a response sensitivity of 123.4 mV·pc$^{-1}$, and a detection limit of $8.32 \times 10^{-8}$ mol/L.

* * * * *